Nov. 20, 1934. A. D. SLACK 1,981,437
METHOD AND APPARATUS FOR MAKING COLOR WEDGES
Filed Dec. 26, 1931

Inventor:
Alfred D. Slack,
By Newton M. Perriss
George A. Gillette, Jr.
Attorneys Patented Nov. 20, 1934

1,981,437

UNITED STATES PATENT OFFICE 1,981,437

METHOD AND APPARATUS FOR MAKING COLOR WEDGES

Alfred D. Slack, Rochester, N. Y., assignor to Eastman Kodak Company, Rochester, N. Y., a corporation of New York Application December 26, 1931, Serial No. 583,180

16 Claims. (Cl. 8—5)

The present invention relates to a method and apparatus of making color wedges and more particularly to a method and apparatus for continuously and efficiently making color wedges.

Up to the present time, color wedges have been manufactured in a rather laborious manner. One known method is to color the material from which the wedge is to be made while in a molten or liquid state with subsequent molding of the material to form a physical wedge which also presents the characteristics of a color wedge.

The primary object of the present invention is the provision of a method and apparatus for forming a tapering bead of dye solution in contact with a flexible transparent material so that the dye solution penetrates to a depth corresponding to the taper of the bead and a color wedge is produced.

A further object of the present invention is the provision of a method and apparatus for continuously advancing strip material in contact with a tapering bead of dye solution so that a color wedge is continuously produced.

Another object of the present invention is the provision of a method and apparatus for forming a bead of dye solution in contact with strip material, said bead being tapered in cross section so that the strip material will be dyed to a graded color intensity.

A still further object of the present invention is the provision of a method and apparatus for forming a bead of dye solution in contact with strip material, said bead being tapered in width and/or in height across the strip material to form a color wedge.

Still another object of the present invention is the provision of an apparatus for forming a tapering bead between the strip material and an applicator for dye solution, said applicator rotating about an axis inclined to the strip material and being of cylindrical or conical formation.

A further object of the present invention is the provision of an apparatus for forming a tapering bead in contact with and across strip material and including an adjustable means for varying the rate at which the bead of dye solution is tapered.

Another object of the present invention is the manufacture of color wedges which have uniform thickness and which are penetrated to gradually increasing depths by a dye solution.

Other and further objects of the present invention will suggest themselves to those skilled in the art to which the invention applies as the description thereof is developed hereinafter.

The method of the invention basically comprises the formation of a tapering bead of dye solution across strip material. The strip material is flexible and transparent, being composed preferably of film base or film support. The strip material may be continuously advanced and because of the gradually increasing amounts of dye solution in contact with the strip material across its width, the dye solution penetrates to gradually increasing depths as the tapering bead widens. The penetration of the dye solution to gradually increasing depths may also be attributed to the greater length of time for which the dye solution is in contact with the strip material at the wider end of the bead.

The dye or dye stuff is dissolved in methyl alcohol, acetone, amyl acetate, or other solvent or mixture of solvents which are solvents of both the dye and the strip material to be colored.

The apparatus for forming the tapering bead of dye solution across the strip material consists of an applicator of either cylindrical or conical formation which is rotated about an axis transverse and inclined to the strip material. The applicator may be mounted so that its inclination to the strip material can be adjusted or varied.

Reference is hereby made to the accompanying drawing in which similar reference numerals designate similar elements and in which.

Figure 1:
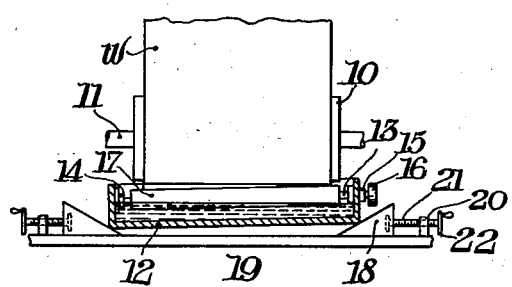
Fig. 1 is a front elevation of the apparatus according to the present invention and with the front wall of the hopper for dye solution cut away to more clearly illustrate the preferred form of the applicator according to the invention.
Figure 2:
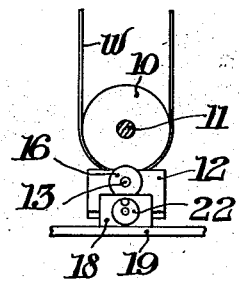
Fig. 2 is an end view of the apparatus according to Fig. 1.
Figure 4:
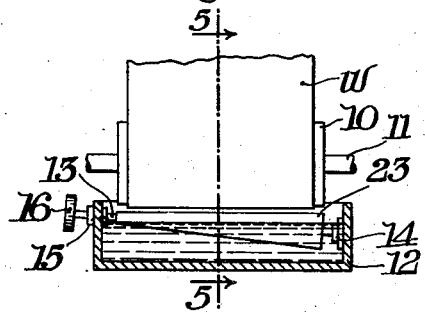
Fig. 4 is a front elevation of a modified form of the invention, the front wall of the hopper for dye solution being cut away to more clearly illustrate the provision of the conical applicator therein.
Figure 5:
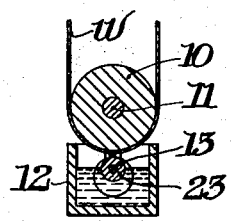
Fig. 5 is a vertical transverse cross section of a modified form of apparatus taken on the line 5—5 of Fig. 4.

In both forms of invention, the strip material w encircles a driving roll 10 which is rotatably supported on shaft 11. The shaft 11 may be driven at variable speeds in any known manner. A hopper 12 is located below the driving roll 10 and is adapted to contain a supply of dye solution. An applicator is rotatably mounted in hopper 12 upon a shaft 13 which is supported in a bracket 14 attached to one end of hopper 12 and which passes through a stuffing gland 15 in the other end of hopper 12. A pulley 16 is mounted upon the end of shaft 13 which protrudes through the stuffing gland 15. Pulley 16 may be driven at variable speeds in any desirable manner not here disclosed.

According to the preferred form of the invention, the applicator comprises a cylindrical roll 17 mounted upon the shaft 13 in hopper 12. An adjustable means for inclining and varying the inclination of the cylindrical roll 17 to the strip material w may comprise any known apparatus for tilting the hopper 12. As specifically disclosed, the adjustable means comprises a wedge 18 slidable upon a base 19.

A threaded block 20 is attached to the base 19 while a threaded rod 21 is rotatably connected at one end to the side of wedge 18 and passes through the threaded block 20. A hand-wheel 22 is mounted upon the other end of threaded rod 21 so that the position of wedge 18 with respect to hopper 12 may be varied. The adjustable means just described is duplicated at the other end of the hopper 12 so that the inclination as well as the spacing of the axis of shaft 13 may be varied with respect to driving roll 10 and strip material w.

In the modified form of the invention the applicator comprises a conical roll 23 which is mounted upon the shaft 13. The conical roll 23 is preferably located with the element thereof nearest the strip material in parallel spaced relation to said strip material. Such parallel spaced relation between the strip material and conical roll 23 may be obtained by inclining the axis of shaft 13 at an angle to the strip material which is equal to the angles of the elements of conical roll 23 with the axis thereof.

In the preferred form of the invention the axis of shaft 13, although inclined to the strip material, is perpendicular to the ends of hopper 12, while in the modified form of the invention, the shaft 13 is inclined to the ends of hopper 12. This necessitates a slight difference in brackets 14 and stuffing glands 15 for each form of the invention. The dye solution, which is made up of a dye stuff or dye dissolved in methyl alcohol, acetone, amyl acetate or other solvent or mixture of solvents which are solvents of both the dye and material to be colored, is placed in hopper 12 to a depth such that the applicator will dip into the dye solution along its entire length.

As the applicator is rotated, the dye solution will be carried in the direction of applicator rotation and a tapering bead will be formed between the applicator and the strip material. According to the preferred form of the invention, the tapering bead will have a formation very similar to that shown in Fig. 3, while according to the modified form of the invention, the tapering bead will have a constant height and will have a form very similar to that shown in Fig. 6.

Since the tapering bead in both forms is wider at one end than at the other, the portions of strip material w at one end are in contact with more dye solution and for a greater length of time than at the other end. The amounts of dye solution and length of time of application vary gradually along the applicator and across the strip material so that the dye solution has an opportunity to penetrate the strip material to greater depth at one end than at the other. The gradual tapering of the bead of dye solution causes a gradual increase or decrease of the dye penetration across the strip material. Thus it will be seen that the tapering bead, in a very simple manner, dyes the strip material as a color wedge. Since the forms of the invention both employ rolls for handling the strip material and dye solution, the invention is particularly applicable to continuously operating methods and apparatus.

Figure 3:
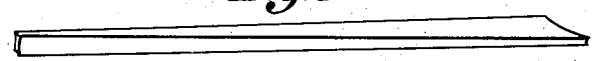
Fig. 3 is a perspective view of the bead of dye solution formed between strip material and the cylindrical applicator shown in Figs. 1 and 2.
Figure 6:
Fig. 6 is a perspective view of the bead formed between the strip material and applicator, according to the modification shown in Figs. 4 and 5.
Figure 7:
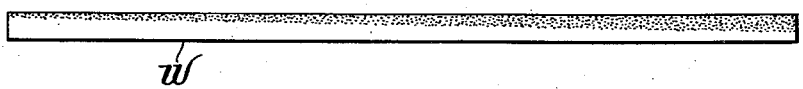
Fig. 7 is an end elevation of a color wedge made according to the present invention and illustrates the penetration of dye solution to gradually increasing depths across the strip material.

The formation of the tapering beads of dye solution will vary in detail with variation in several factors, such as the viscosity of the dye solution, the temperature of the dye solution, the speed at which the applicator is rotated, and the speed at which the strip material is advanced. However, the bead will always have the general formation, as shown, being wider at one end than at the other in both forms of the invention, being higher at one end than at the other according to the preferred form of the invention as shown in Fig. 3, and being of constant height across the strip material according to the modified form of the invention as shown in Fig. 6.

The product of the method and apparatus here disclosed is of uniform thickness throughout in contra-distinction to previously known color wedges which were also physically formed in the shape of wedges. Furthermore, the depth of dye penetration into the strip material may be controlled by variation of the inclination of the applicator axis to the strip material and it is possible therefore to vary the color gradation of a wedge without varying its physical formation.

The specific forms of the invention herein disclosed are presented as illustrations and are intended in no way to limit the scope of the invention which is defined in the appended claims.

Having now particularly described my invention, what I claim as new and desire to secure by Letters Patent of the United States is:

1. The method of applying a penetrant solution to strip material, which comprises advancing the strip material and forming a tapering bead of said solution in contact with the moving strip material.

2. The method of applying dye solution to strip material which comprises moving the strip material and forming a tapering bead of dye solution in contact with said strip material.

3. The method of applying a dye solution to strip material which comprises moving the strip material and forming a bead of dye solution in contact with said strip material and of increasing cross-section thereacross.

4. The method of applying a dye solution to strip material which comprises moving the strip material and forming a bead of dye solution in contact with said strip material and of increasing height thereacross.

5. The method of applying a dye solution to strip material which comprises moving the strip material and forming a bead of dye solution in contact with said strip material and of increasing width thereacross.

6. The method of continuously applying a dye solution to strip material which comprises continuously advancing said strip material and continuously forming a tapering bead of dye solution in contact with said strip material.

7. In an apparatus for applying a dye solution to strip material, the combination with an advancing means for continuously moving said strip material, of an applicator means adjacent said strip material and for forming a tapering bead of dye solution in contact with said strip material.

8. In an apparatus for applying a dye solution to strip material, the combination with an advancing means for continuously moving said strip material, of an applicator adapted to rotate about an axis inclined to said strip material and to form a tapering bead of dye solution between said strip material and said applicator whereby the dye solution correspondingly penetrates the strip material and a color wedge is produced.

9. In an apparatus for applying a dye solution to strip material, the combination with an advancing means for continuously moving said strip material, of a hopper adapted to contain the dye solution and an applicator adapted to rotate in said dye solution about an axis inclined to said strip material and to form a tapering bead of dye solution between said strip material and said applicator whereby the dye solution correspondingly penetrates the strip material and a color wedge is produced.

10. In an apparatus for applying a dye solution to strip material, the combination with an advancing means for continuously moving said strip material, of a cylindrical applicator adapted to rotate with the elements thereof inclined to said strip material and to form a tapering bead of dye solution between said strip material and said cylindrical applicator.

11. In an apparatus for applying a dye solution to strip material, the combination with an advancing means for continuously moving said strip material, of a cylindrical applicator adapted to rotate with the elements thereof inclined to said strip material and to form a tapering bead of dye solution between said strip material and said cylindrical applicator, and adjustable means for varying the inclination of said cylindrical applicator to the strip material.

12. In an apparatus for applying a dye solution to strip material, the combination with an advancing means for continuously moving said strip material, of a hopper adapted to contain the dye solution, a cylindrical applicator mounted in said hopper and adapted to rotate about an axis inclined to said strip material and to form a tapering bead of dye solution between said strip material and said cylindrical applicator, and an adjustable wedge means cooperating with said hopper and adapted to vary the inclination of said hopper and cylindrical applicator to said strip material.

13. In an apparatus for applying a dye solution to strip material, the combination with an advancing means for continuously moving said strip material, of a conical applicator adapted to rotate about an axis inclined to said strip material and to form a tapering bead of dye solution between said strip material and said conical applicator.

14. In an apparatus for applying a dye solution to strip material, the combination with an advancing means for continuously moving said strip material, of a conical applicator adapted to rotate with the elements thereof nearest the strip material in parallel spaced relation to said strip material and to form a tapering bead of dye solution between said strip material and said conical applicator.

15. In an apparatus for applying a dye solution to strip material, the combination with an advancing means for continuously moving said strip material, of a conical applicator adapted to rotate about an axis inclined to said strip material and to form a tapering bead of dye solution between said strip material and said conical applicator, the angle between the elements of the conical applicator and said axis being equal to the angle inclination of the axis to the strip material.

16. As a new article of manufacture, a color wedge having uniform thickness and dyed to increasing depths thereacross.

ALFRED D. SLACK.